United States Patent [19]

Killat et al.

[11] 4,402,748

[45] Sep. 6, 1983

[54] INK FORMULATIONS CONTAINING A CURABLE AMMONIUM POLYAMIDOAMINE AS A FIXING AGENT

[75] Inventors: George R. Killat; Larry R. Wilson, both of Midland, Mich.

[73] Assignee: The Dow Chemical Company, Midland, Mich.

[21] Appl. No.: 383,905

[22] Filed: Jun. 1, 1982

[51] Int. Cl.³ .............................................. C09D 11/10
[52] U.S. Cl. ...................................... 106/20; 106/22; 106/23; 260/DIG. 38; 524/606
[58] Field of Search ............................ 106/20, 22, 23; 260/DIG. 38; 524/606

[56] References Cited

U.S. PATENT DOCUMENTS

| | | | |
|---|---|---|---|
| 3,305,493 | 2/1967 | Emmons | 528/310 |
| 3,864,296 | 2/1975 | Faessinger | 8/7 |
| 4,238,234 | 12/1980 | Lang | 106/22 |
| 4,256,818 | 3/1981 | Blossey et al. | 524/606 |
| 4,264,366 | 4/1981 | Peng | 106/22 |
| 4,269,627 | 5/1981 | Hwang | 106/22 |

*Primary Examiner*—Ronald W. Griffin

[57] ABSTRACT

Substrates such as paper towels which are printed with an ink formulation containing a polyamidoamine having curable ammonium moieties exhibit improved print retention upon exposure to aqueous detergent compositions.

10 Claims, No Drawings

INK FORMULATIONS CONTAINING A CURABLE AMMONIUM POLYAMIDOAMINE AS A FIXING AGENT

BACKGROUND OF THE INVENTION

This invention relates to ink formulations containing curable polymeric fixing agents.

Printing inks containing a dye or pigment and a cationic fixing agent such as a polyamide amine or a polyethylene imine are known. However, the printings obtained with such inks on nonwoven fabrics and particularly on tissue paper do not exhibit satisfactory fastnesses towards a large number of agents, e.g., alcohol, milk, alkali, acid, solvents, detergents, etc., so that the printed nonwoven fabrics may not be used for e.g., various domestic tasks without bleeding. When the cationic fixing agent is a polyamide amine, the printing inks must also contain a volatile amine or ammonia to inhibit premature reaction between the cationic fixing agent and dyes. This confers an unpleasant odor to the printed nonwoven fabric, particularly when this is immediately rolled up after the printing in a continuous production process. Furthermore, these inks often contain further additives such as a binding agent, e.g., a saponifiable derivative or a saponifiable maleic resin, and their pH exceeds 9 to improve their stability in storage so that they are not compatible with most pigments and dyes.

In view of the foregoing deficiencies of conventional ink formulations, it is desirable to provide an ink formulation which is odorless and exhibits improved fastness after application.

SUMMARY OF THE INVENTION

The present invention is such an improved ink formulation comprising an aqueous medium having dispersed therein dye and/or a pigment and a fixing amount of a water-soluble curable ammonium polyamidoamine.

In another aspect, the invention is a method for printing or dyeing a substrate which method comprises applying the aforementioned ink formulation to the substrate and then subjecting the applied formulation to conditions sufficient to cure the ammonium polyamidoamine.

In a final aspect, this invention is a substrate having the cured ink formulation printed thereon.

Surprisingly, substrates printed in accordance with this invention do not exhibit the loss of print, bleeding, etc., observed for conventional formulations, particularly when the printed substrate is washed in detergent. As a result, the present invention is particularly useful in the printing of paper towels and other paper products as well as in the printing of woven and nonwoven fabrics.

DETAILED DESCRIPTION OF THE ILLUSTRATIVE EMBODIMENTS

The ammonium polyamidoamines employed as the fixing agent in this invention are advantageously characterized as having a polyamidoamine backbone having in the backbone a cross-linking ammonium moiety and/or bearing at least one pendant cross-linking ammonium moiety. When the ammonium moiety is in the backbone, it is represented by the formula:

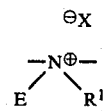

wherein E, $R^1$ and $X^\ominus$ are as defined hereinafter. When pendant, ammonium moiety, hereinafter also referred to as $Z^\oplus$, is represented by the formula:

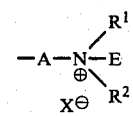

wherein each $R^1$ and each $R^2$ are independently hydrogen, halohydroxyhydrocarbyl, hydrocarbyl, hydroxyhydrocarbyl or aminohydrocarbyl, wherein amino is a secondary or tertiary amino; E is a monovalent hydrocarbon radical bearing an epoxy group or a group or groups capable of being converted to an epoxy group or E and $R^1$ are collectively a propylene radical or substituted propylene radical

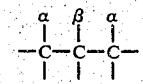

wherein the α-carbon substituents, if any, are $C_1$–$C_3$ alkyl and the β-carbon substituent, if any, is hydroxy, halo, hydrocarbyl or hydroxyhydrocarbyl; A is a divalent organic radical, e.g., alkylene or amidoamine; X is a monovalent or polyvalent anion common to conventional ammonium salts. For the purposes of this invention, the term "hydrocarbyl" is defined as a monovalent hydrocarbon radical such as alkyl, cycloalkyl, aryl, alkenyl and the like. Preferred ammonium polyamidoamines have at least one quaternary ammonium repeating unit represented by the formula:

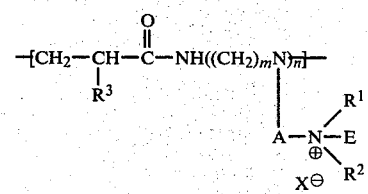

wherein A, E, X, $R^1$ and $R^2$ are as defined before except that neither $R^1$ nor $R^2$ is hydrogen; each $R^3$ is independently hydrogen or lower alkyl, e.g., methyl or ethyl, each m is a whole number from 2 to 6; ad n is a whole number from 1 to 3, more preferably 1 or 2, most preferably 1. Suitable, but less preferred, quaternary ammonium moieties include those represented by the formula:

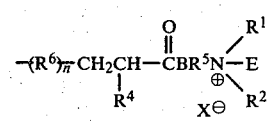

wherein $R^1$, $R^2$, E and $X^\ominus$ are as defined hereinbefore; $R^6$ is a divalent organic radical containing a primary or secondary amine moiety such as amidoamine; B is —NH— or —O—; $R^5$ is a divalent organic radical having at least 2 carbons such as alkylene, e.g., ethylene; and n is 0 or 1.

In the more preferred quaternized polyamidoamines, A is an amidoamino radical represented by the formula:

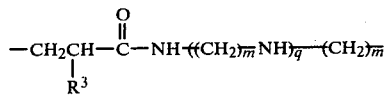

wherein $R^3$ and m are as defined hereinbefore and q is zero or a whole number from 1 to 2; each $R^1$ is independently alkyl, each E is independently oxiranyl or E and $R^1$ are collectively 2-hydroxypropylene. In the most preferred quaternized polyamidoamines, E and $R^1$ are collectively 2-hydroxypropylene such that the pendant quaternary ammonium moiety contains an azetidinium ring and is represented by the formula:

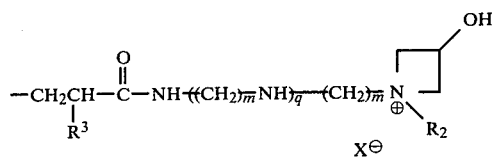

wherein $R^3$ is hydrogen or methyl; m is 2; q is 0, 1, 2 or 3; X is chloride and $R^2$ is alkyl, especially methyl, halohydroxyalkyl, especially 3-chloro-2-hydroxy propyl, or epoxy, especially 2,3-epoxy propyl.

In the curable ammonium polyamidoamine, enough curable ammonium moieties are present to enable the polyamidoamine to fix the print or dye to the substrate even after repeated washing with detergent. Preferably, the ammonium polyamidoamine contains at least 0.5 mole equivalent, most preferably from about 0.8 to about 1 mole equivalent, of the curable ammonium moiety per mole equivalent of amine nitrogen in the polyamidoamine. The preferred curable ammonium polyamidoamines have weight average molecular weights (Mw) in the range from about 1000 to about 100 million, more preferably from about 1000 to about 1 million.

Most preferably the ammonium polyamidoamines of this invention are random polymers represented by the statistical formula:

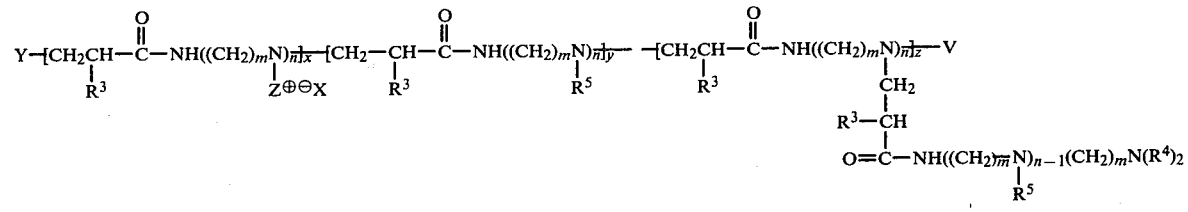

wherein $R^3$, $Z^⊕$, $X^⊖$, m and n are as defined hereinbefore; Y is a terminal group characteristic of polyamidoamines; V is hydrogen or the residue of polymerization to form a polyamidoamine; each $R^4$ is independently hydrogen or lower alkyl, e.g., $C_1$-$C_3$ alkyl; each $R^5$ is independently hydrogen or

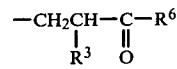

wherein $R^3$ is as defined before and $R^6$ is —$NH_2$; —OH or —$OR^7$ wherein $R^7$ is hydrocarbyl such as alkyl; x is a whole number from 1 to 1000; y is 0 or a whole number from 1 to 200; and z is 0 or a whole number from 1 to 200, provided that the ratio of x to (y+z) is at least 3:1, most preferably at least 10:1.

In the preparation of the curable ammonium polyamidoamines of this invention, it is preferred to react a linear polyamidoamine or a branched polyamidoamine with epihalohydrin or other compound containing a moiety as defined by E hereinbefore to yield the desired ammonium polyamidoamine wherein the pendant ammonium moiety contains crosslinking (curable) functionality.

The linear polyamidoamines are conveniently prepared in the manner described in U.S. Pat. No. 3,305,493, the relevant portions of which are incorporated herein by reference. In general, the essentially linear polyamidoamine is prepared by contacting an alkylenediamine or a polyalkylene polyamine with the ethylenically unsaturated carboxylic compound, e.g., alkyl acrylate or methacrylate, acrylamide, acrylic acid or methacrylic acid, under reactive conditions. Preferably, the foregoing reactants are employed in stoichiometric ratio to form a linear polyamidoamine represented by the formula:

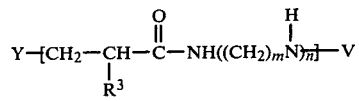

wherein $R^3$, Y, V, m and n are as defined hereinbefore. Advantageously, the linear polyamidoamine has a weight average molecular weight (Mw) of at least about 500, preferably at least 1000, most preferably from about 3000 to about 10,000.

Exemplary alkylene polyamines and polyalkylene polyamines include ethylenediamine, diethylenetriamine, triethylenetetramine, tetraethylenepentamine, pentaethylenehexamine, hexaethyleneheptamine, 1-aminoethylpiperazyl diethylenetriamine, 1-aminoethylpiperazyl triethylenetetramine, propylenediamine, dipropylenetriamine, butylenediamine, aminoethyl-propylenediamine and other polyamines having at least one primary amino group separated from another primary amino or secondary amino group by 2 to 4 carbon atoms. Of these polyalkylene polyamines, the higher molecular weight polyethylene polyamines and polypropylene amines such as those having a weight average of 100 to 15,000 are preferred. Of particular interest are the polyalkylene polyamines that are crosslinked with ethylene dichloride or the like as well as mixtures of such cross-linked polyamines with other polyalkylene polyamines as mentioned hereinbefore.

The branched polyamidoamine is preferably prepared by contacting the linear polyamidoamine with an ethylenically unsaturated ester, acid or amide under conditions sufficient to cause a Michael addition reaction between the amino moieties of the polyamidoamine and the ethylenically unsaturated moieties of the ester, acid or amide. Preferably, the unsaturated compound is an alkyl ester of acrylic or methacrylic acid, most preferably methyl acrylate or ethyl acrylate.

The addition of the ethylenically unsaturated compound to the linear polyamidoamine should be performed at a temperature which avoids substantial cross-linking of the polymer. Generally, a temperature in the range from about 0° C. to about 80° C. is operable, with temperatures from about 0° C. to about 50° C. being preferred. This reaction can be conducted neat. However, the presence of a diluent which dissolves the polyamidoamine but is substantially inert to the reactants is desirable as it facilitates more complete mixing and more efficient heat transfer of the reaction medium during the exothermic Michael addition reaction. Water and $C_1$ to $C_4$ alcohols are preferred diluents. Methanol is the most preferred diluent.

The ratio of the equivalents of the aforementioned unsaturated compound to the equivalents of labile hydrogens borne by the nitrogen atoms in the linear polyamidoamine can be varied to produce the desired substitution of pendant ester groups on the polyamidoamine. If complete substitution is desired, a stoichiometric amount or an excess of the alkyl acrylate or other unsaturated compound can be employed. If a lesser degree of substitution is desired, the reactants can be combined in the appropriate ratios and essentially completely reacted. It is desirable that at least about 50 mole percent of the labile hydrogens be reacted with alkyl acrylate or the other unsaturated reactants to endow the ultimate branched polymer with the unique properties and advantages described herein.

The polyamidoamine bearing pendant groups corresponding to the following formula:

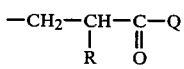　　　　　Formula VI wherein R is —H or —$CH_3$ and Q is —OH, —$NH_2$ or a $C_1$-$C_{10}$ alkoxy is reacted with an alkylene diamine or polyalkylene polyamine as defined hereinbefore to produce the branched polyamidoamines. Prior to introduction of the polyamine, essentially all of the unreacted alkyl acrylate or methacrylate or corresponding acid or amide can be removed by distillation. Preferably only the amount of alkyl acrylate or methacrylate sufficient to produce the desired degree of substitution is added to reaction mixture containing the linear polyamidoamine. A sufficient amount of the polyamine is advantageously employed to suppress premature cross-linking of the polyamidoamine which can occur through the ammonium moieties. Typically, a 200 to 300 mole percent excess of the polyamine relative to the ammonium moieties on the polyamidoamine is sufficient to avoid gelation of the polyamidoamine due to cross-linking.

The conditions necessary to promote reaction of the substituted polyamidoamine with the polyamine will vary dependent on the identity of Q in the pendant groups corresponding to Formula VI. If Q is a $C_1$ to $C_{10}$ alkoxy, the reaction involves a simple amidation of the pendant ester groups on the polyamidoamine which proceeds under relatively mild conditions. This amidation of the ester occurs readily at temperatures in the range from about 20° C. to about 150° C. The amidation of the ester can be performed neat, but an inert diluent in which the reactants are soluble is preferably present. Water is a preferred diluent, but hydrolysis of the ester groups present can occur at higher reaction temperatures unless an excess of the polyamine reactant is present. Methanol or other lower alkanols are also preferred as diluents.

If Q in Formula VI is —OH or —$NH_2$, more severe reaction conditions must be utilized than when Q is an alkoxy group. Reaction temperatures in the range from about 100° C. to about 200° C. are generally operable, with temperatures of from about 130° to about 170° C. being preferred. Generally, a diluent is not necessary at these reaction conditions because the substituted polyamidoamine is readily agitated at these reaction temperatures.

The branched polyamidoamine is conveniently recovered by distillation of solvents and by-products from the polymer at reduced pressure. The time required to effect substantially complete reaction will vary dependent on the reaction temperature and other factors.

In the conversion of all or a portion of the amine moieties of the linear or branched polyamidoamine to ammonium form, the linear or branched polyamidoamine is contacted with an alkylating agent, a mixture of alkylating agents or other agents capable of converting the amine to ammonium form such that the pendant amino nitrogens of the branched polyamidoamine and the linear polyamidoamines are converted to ammonium moieties represented by the following formula:

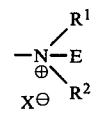

and/or the available backbone amine moieties are converted to ammonium moieties represented by the formula:

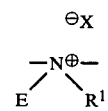

wherein each $R^1$, $R^2$, E and $X^\ominus$ are as defined hereinbefore.

In the preparation of the more preferred quaternized polyamidoamines, the linear or branched polyamidoamine is reacted with an epoxy compound such as an epihalohydrin or an azetidinium forming compound such as a 1,3-dihaloalkane under conditions sufficient to cause the amine groups of the polyamidoamine to be alkylated. It is preferred to carry out this alkylation reaction in a solvent. If a solvent system is used in the formation of the polyamidoamine, then the same solvent or water diluted solvent may be used in the alkylation reaction. Thus, water, lower alkanols such as methanol and mixtures thereof are preferred solvents for the alkylation reaction. In general, sufficient solvent is employed to just solubilize the reactants and to permit easy stirring. Generally, solutions containing from about 30 to about 75 weight percent of the polyamidoamine are employed. Following dissolution of the polyamidoamine, the epihalohydrin or other suitable alkylating agent is added. In the case of epihalohydrin, the reaction is preferably carried out at temperatures in the range from about 0° up to about 35° C. The resulting alkylated polyamidoamine, which is prepared using epihalohydrin, contains an epoxy group and/or halohydrin groups in the quaternary ammonium moiety. This material may be employed as a fixing agent or may be converted to an azetidinium ring by dilution with water and heating. Residual halohydrin groups may be converted to epoxy groups by contacting this material with a neutralizing agent for acid such as sodium hydroxide, calcium carbonate, sodium carbonate, sodium bicarbonate and the like under conditions described by Weissberger in "Heterocyclic Compounds with Three and Four Membered Rings," Interscience Publishers, Part 2, page 891 (1964). In instances wherein it is desirable to prepare a quaternary ammonium compound in which the amino nitrogen is substituted with an alkyl or hydroxyalkyl group in addition to an epoxy group or an azetidinium ring, the branched polyamidoamine may be first alkylated with an alkyl halide or hydroxyalkyl halide or alkylene oxide and then subsequently alkylated with epihalohydrin.

The resulting ammonium polyamidoamine is now ready for use as a fixing agent in the ink formulation of the present invention.

In addition to the aforementioned fixing agent, the aqueous ink formulations of this invention also contain a dye and/or a pigment. Examples of suitable dyes include the anionic dyestuffs which may react with the cationic radicals of the ammonium polyamidoamine so as to form heteropolar bonds. Suitable anionic dyes are those containing essentially sulpho and/or carboxylic acid groups. They belong, for example, to the so-called acid, direct, indigosol, reactive, metal-complex or metallisable dyestuff classes. They are described in the "Colour Index" under the headings "Acid Dyes," "Direct Dyes," "Reactive Dyes," "Mordant Dyes" and "Solubilized Vat Dyes," the reactive, acid, direct and indigosol dyes being preferred for inclusion in the ink compositions of the invention.

Suitable pigments which may be included in the ink formulation as an alternative to the dye or in conjunction with one or more dyes are those described in the "Colour Index" under the description "Pigment" and which are dispersible in water.

The amount of coloring material present in the ink will depend on the depth of shade required in the final print and on the type of dye and/or pigment used. Generally, when only dyes are present in the ink, the weight ratio of the dye to the ammonium polyamidoamine is from 10:1 to 1:20, preferably from 1:1 to 1:10. When the printing ink contains a pigment alone, the weight ratio of the pigment to the ammonium polyamidoamine is generally from 1:10 to 3:1, preferably from about 1.7:1. When a mixture of pigment and dyes is present in the ink, the weight ratio of the whole coloring material (anionic dye+pigment) to the ammonium polyamidoamine is generally from 1:9 to 5:1, with the weight ratio of the pigment to the dye varying in this range in wide limits.

The amount of water in the ink formulation depends on the desired viscosity. The formulation may be prepared in a concentrated form which, if necessary, may be further diluted with water. The total amount of water may be up to 80 percent by weight. Preferably, the ink formulations contain water in an amount from 30 to 60 percent by weight, more preferably from 40 to 50 percent. The pH of the ink formulations is from 6 to 11, preferably from 7 to 9.

In addition to the coloring material and the fixing agent, the ink formulations provided by the invention may contain an organic solvent miscible with water. Such solvents are conventional in the flexo-printing art and may be, e.g., a glycol or a glycol ether, preferably ethylene glycol. The amount of glycol or glycol ether present in the ink formulations may be up to 30 percent, preferably from 15 to 25 percent by weight (based on the weight of the formulation).

When a pigment is in the ink formulation, it is convenient to add a dispersing agent selected from a cationic, anionic and nonionic dispersing agent or a mixture thereof, preferably a mixture of a cationic, anionic and nonionic dispersing agent. Such dispersing agent is often present in the commercially available pigment.

The viscosity of the ink formulations according to the invention is sufficient to permit printing of the desired substrate.

These formulations may be prepared by thoroughly mixing together the constituent ingredients in a determined order. Coloring materials in powder form are first dissolved in water (in the case of an anionic dye) or mixed into a paste with water (in the case of a pigment); in the latter case, the dispersing agent is added to the pigment paste if such is not present in the commercially available pigment. The same applies for the commercially available pigment paste forms. Subsequently, a glycol or glycol ether, e.g., ethylene glycol, is optionally added to the solution or paste. In the case of coloring materials in the form of a liquid preparation, the glycol may be added without any previous dilution of the liquid preparation with water. The resulting pre-mixture of coloring material/water/glycol is then stirred into an aqueous solution of the fixing agent. When the coloring material is a pigment, the addition can be reversed, i.e., the fixing agent may be added to the pre-mixture. Where required, the resulting ink formulations may be further diluted with water to obtain the desired viscosity.

The ink formulations are particularly suitable for use in the flexo-printing process. Of particular interest is their use in printing cellulosic nonwoven fabrics, preferably tissue paper, by flexo-printing methods. Printing with these formulations may be carried out at room temperature. Fixation of the printings occurs at room temperature after a period of about 72 hours. The fixation process may be accelerated in a known manner, e.g., by heat.

The following examples are given to illustrate embodiments of the invention and should not be construed as limiting its scope. In these examples, all parts and percentages are by weight unless otherwise indicated.

EXAMPLE 1

A. Preparation of Linear Polyamidoamine

Into a 250-ml three-neck round bottom flask equipped with a reflux condenser, air driven stirrer and addition funnel is charged 60.1 g (1 mole) of ethylenediamine. To the flask is then added with stirring 86.09 g (1 mole) of methyl acrylate by dripping it slowly into the flask over a period of 35 minutes. The temperature of the reaction mixture rises to 70° C. during this addition and analysis of the reaction mixture using proton nuclear magnetic resonance indicates that all of the double bond has disappeared. The reflux condenser and addition funnel are replaced with a nitrogen sparge and a distillation apparatus. Using a steam bath, the reaction mixture is heated to 90°–95° C. for 24 hours. After this time, the reaction mixture is a very viscous, light yellow amorphous solid. Analysis of this reaction mixture indicates that all of the ester moieties have reacted thereby yielding a linear polyamidoamine having a weight average molecular weight (Mw) as determined by light scattering of 6000.

B. Preparation of Branched Polyamidoamine

The aforementioned linear polyamidoamine is diluted with water to 65 percent solids. A 50 g portion of this solution is charged into a 250 ml three-neck round bottom flask equipped with stirrer and reflux condenser and 24.54 g (stoichiometric amount with respect to amino hydrogens of the linear polyamidoamine) of methyl acrylate is added at one time. The temperature of the reaction mixture increases from ambient to 35° C. and is then heated with stirring at 80° C. for four hours. Analysis of the reaction mixture at this point indicates approximately 95 percent of the methyl acrylate has been added to the polymer to provide a linear polyamidoamine having carboxylate ester branches. To this material is added approximately 70 g of ethylenediamine (4 moles of ethylenediamine per mole of ester) and the heating of the reaction mixture is continued for an additional four hours. Analysis of this mixture using proton NMR indicates complete conversion of the ester moieties to amide moieties. Excess ethylenediamine, methanol and water are removed using a water aspirator vacuum at 60°–95° C. For purposes of comparison, this nonquaternized branched polyamidoamine (Fixing Agent F) is tested for print retention as described hereinafter.

C. Quaternization of Linear Polyamidoamine

Into a 250 ml, three-neck round bottom flask equipped with an air driven stirrer and thermometer is charged 22.33 g of a 65 percent solution of the aforementioned linear polyamidoamine. The flask is cooled to 5° C. and 11.19 g of epichlorohydrin (epi) (1:1 mole ratio of amine hydrogen to epi) is added with stirring to the flask. The reaction mixture is allowed to warm to room temperature over a 5-hour period and then stirred for 2 hours. To the flask is added 68 g of water heated to 65° C. The resulting stirred mixture is heated at 65° C. for one hour to yield a clear solution and then allowed to cool to room temperature. A quaternized completely linear polyamidoamine (Fixing Agent A) is recovered.

D. Quaternization of Branched Polyamidoamine

Into a 100 ml, three-neck round bottom flask equipped with an air driven stirrer and thermometer is charged 16.79 g of a 57 percent solution of the aforementioned branched polyamidoamine. The flask is cooled to 5° C. and 7.73 g of epichlorohydrin (epi) (1:1 mole ratio of pendant amine hydrogen to epi) is added with stirring to the flask. The reaction mixture is allowed to warm to room temperature over a 7½-hour period and 41.81 g of water heated to 70° C. is added. The resulting stirred mixture is heated at 65° C. for one hour to yield a clear solution and then allowed to cool to room temperature. A quaternized 100 percent branched polyamidoamine (Fixing Agent B) is recovered.

A second fixing agent (Fixing Agent C) is prepared by a similar procedure using a branched polyamidoamine having an $M_w$ of 6000.

For purposes of comparison, a linear polyamidoamine having an $M_w$ of 15,000 is quaternized with 2-hydroxy-3-chloropropyl trimethyl ammonium chloride using the foregoing quaternization conditions (labeled Fixing Agent G in Table I).

E. Preparation and Application of Ink Formulations

Several ink formulations (Sample Nos. 1–3 and $C_1$ and $C_2$) are prepared using the aforementioned fixing agents by mixing 20 g of an aqueous liquid containing 2 g of phthalocyamine blue pigmented toner with 1.2 g of the specified fixing agent at room temperature.

A framed commercial paper towel is printed by applying ~0.01 g of the ink formulation to the towel using a Roto-Gravure Roller (165 lines/inch manufactured by Anilox). The printed towel is then heated at 220° F. for 5 minutes and then wetted with a strong detergent. The wetted towel is then blotted with a clean towel to determine the fastness of the printing. The results of this test are reported in Table I.

TABLE I

| Sample No. | Fixing Agent (1) | Mole Ratio of Quat to Amine (2) | Conc. of Fixing Agent, % (3) | Performance Rating (4) |
|---|---|---|---|---|
| 1 | A | 1:1 | 6.0 | Passed |
| 2 | B | 1:1 | 6.0 | Passed |
| 3 | C | 1:2 | 6.0 | Passed |
| $C_1$* | F | 0:1 | 6.0 | Failed |
| $C_2$* | G | 1:1 | 6.0 | Failed |

*Not an example of the invention.
(1) A - Linear Polyamidoamine having an $M_w$ of 6000 quaternized with epichlorohydrin (epi) to mole ratio of 1 mole of epi to one mole of amine hydrogen.
B - Branched Polyamidoamine having an $M_w$ of 8000 quaternized with epi to 1:1 mole ratio to amine hydrogen.
C - Branched Polyamidoamine having an $M_w$ of 6000 quaternized with epi to 1:1 mole ratio to amine hydrogen.
F - Branched Polyamidoamine having an Mn of 6000 which is not quaternized.
G - Linear Polyamidoamine having an $M_w$ of 15,000 which is quaternized with 2-hydroxy-3-chloropropyl trimethyl ammonium chloride to a 1:1 mole ratio to amine hydrogen.
(2) Percent of fixing agent based on total weight of formulation.
(3) Test indicates ability of fixing agent to retain pigment formulation on paper towel after the towel has been (a) wetted with a strong household detergent having a pH of 9 and (b) then blotted with a second towel. "Failed" indicates visible bleeding of the pigment and "Passed" indicates no visible bleeding.

As evidenced by the data in Table I, the curable ammonium polyamidoamines of the present invention illustrated by Sample Nos. 1–3 exhibit pigment fixing capability that is superior to that of nonquaternized polyamidoamines (Sample No. $C_1$) and quaternized polyamidoamines which do not contain curable ammonium groups (Sample No. $C_2$).

What is claimed is:

1. An ink formulation comprising (1) an aqueous medium having a dye, a pigment or a combination of a dye and a pigment dispersed therein and (2) a fixing amount of a water-soluble curable ammonium polyamidoamine.

2. The formulation of claim 1 wherein the polyamidoamine has a polyamidoamine backbone and curable ammonium moieties in its backbone and/or pendant therefrom.

3. The formulation of claim 1 wherein each of the curable ammonium moieties is individually represented by the formulas:

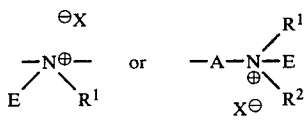 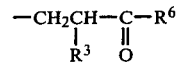

wherein each $R^1$ and each $R^2$ are independently hydrogen, halohydroxyhydrocarbyl, hydrocarbyl, hydroxyhydrocarbyl or aminohydrocarbyl, wherein amino is a secondary or tertiary amino; E is a monovalent hydrocarbon radical bearing an epoxy group or a group or groups capable of being converted to an epoxy group or E and $R^1$ are collectively a propylene radical or substituted propylene radical wherein the α-carbon substituents are $C_1$–$C_3$ alkyl and the β-carbon substituent is hydroxy, halo, hydrocarbyl or hydroxyhydrocarbyl; A is a divalent organic radical; X is a monovalent or polyvalent anion common to conventional ammonium salts.

4. The formulation of claim 3 wherein the polyamidoamine contains an ammonium repeating unit represented by the formula:

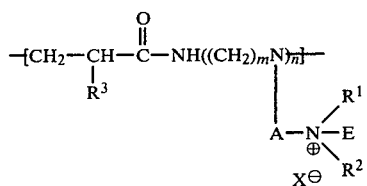

wherein each $R^1$ and each $R^2$ are independently hydrocarbyl, hydroxyhydrocarbyl or aminohydrocarbyl wherein the amino is a secondary or tertiary amino; E is a monovalent hydrocarbon radical bearing an epoxy group or a group or groups capable of being converted to an epoxy group or E and $R^1$ are collectively a propylene radical or substituted propylene radical wherein the α-carbon substituents are $C_1$–$C_3$ alkyl and the β-carbon substituent is hydroxy, halo, hydrocarbyl or hydroxyhydrocarbyl; A is a divalent organic radical, X is a monovalent or polyvalent anion common to conventional ammonium salts; each $R^3$ is independently hydrogen or lower alkyl, e.g., methyl or ethyl, each m is a whole number from 2 to 6; and n is a whole number from 1 to 3.

5. The formulation of claim 3, wherein the polyamidoamine is a random polymer represented by the statistical formula:

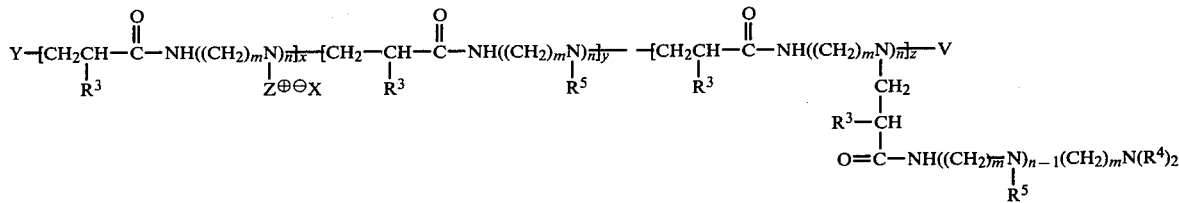

wherein Z is the curable ammonium moiety; each $R^3$ is independently hydrogen or methyl; each $R^4$ is independently hydrogen or lower alkyl; each $R^5$ is independently hydrogen or wherein $R^6$ is $NH_2$, OH or $OR^7$ wherein $R^7$ is hydrocarbyl; Y is a terminal group characteristic of a polyamidoamine; V is hydrogen or the residue of polymerization to form a polyamidoamine; each m is a whole number from 2 to 6; n is 1 or 2; x is a whole number from 1 to 1000; y is 0 or a whole number from 1 to 200; and z is 0 or whole number from 1 to 200, provided that the ratio of x to (y+z) is at least 3:1.

6. The formulation of claim 2, 3, 4 or 5 wherein the pendant curable ammonium moiety is represented by the formula:

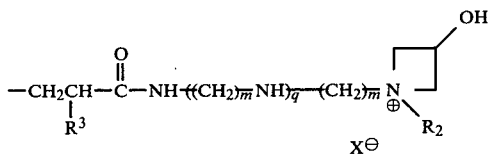

and the backbone curable ammonium moiety is represented by the formula:

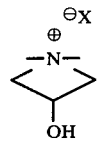

wherein $R^3$ is hydrogen or methyl; m is 2; q is 0, 1, 2 or 3; X is chloride and $R^2$ is alkyl, halohydroxyalkyl or epoxy.

7. The formulation of claim 6 wherein $R^3$ is hydrogen and $R^2$ is 3-chloro-2-hydroxypropyl or 2,3-epoxypropyl.

8. A method for printing or dyeing a substrate which method comprises applying the ink formulation of claim 1 to the substrate and subjecting the applied formulation to conditions sufficient to cure the ammonium polyamidoamine.

9. A method for printing or dyeing a substrate which method comprises applying the ink formulation of claim 6 to the substrate and subjecting the applied formulation to conditions sufficient to cure the ammonium polyamidoamine.

10. A printed substrate comprising a substrate having printed thereon a cured form of the formulation of claim 6.

* * * * *